Jan. 30, 1968   P. B. MANDAS   3,365,826
MAP HOLDER
Filed Oct. 4, 1965
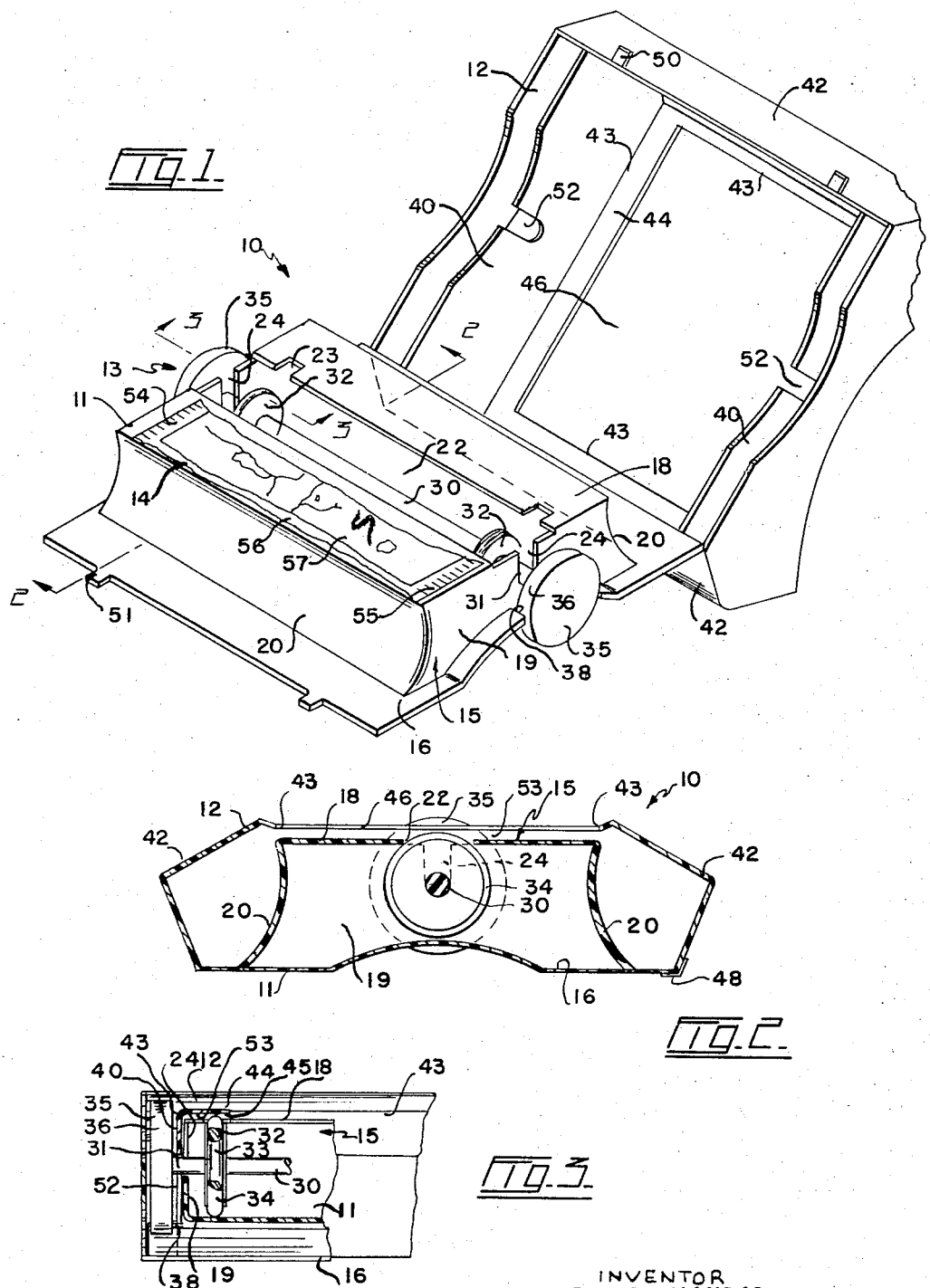
INVENTOR
PHILIP B. MANDAS
BY
Featherstonhaugh & Co.
ATTORNEYS 3,365,826
MAP HOLDER
Philip B. Mandas, Cedar Mount, Malahat, Vancouver Island, British Columbia, Canada
Filed Oct. 4, 1965, Ser. No. 492,776
2 Claims. (Cl. 40—86)

ABSTRACT OF THE DISCLOSURE

A map exhibiting apparatus having a case provided with a window and a central platform across which a prerolled strip map is driven by manually operated friction rollers.

---

This invention relates to devices for holding and displaying strip maps designed generally for the use of motorists on long trips.

It is appreciated that devices of this nature have heretofore been devised wherein a strip map may be enclosed within a casing, the latter having a window, said casing being provided with means whereby the map may be advanced in either direction past the window to expose details of the route to be followed by the motorist.

In such devices of prior design, there has usually been provided spools rotatably mounted in the casing at either end of the window over which the map is wound. It is generally necessary to provide means for rotating the spools in either direction so that the map may be advanced in either direction across the window.

This has necessitated devices of rather cumbersome and complicated manufacture and hence has resulted to a device of too costly a nature. It has also resulted in a device in which the replacement of one map for another is rather awkward as it is necessary to engage opposite ends in the spools in order that the map may be drawn by one or the other of the spools in order to advance the map. The spools, with which such devices are provided, must also carefully engage with the map in order that jamming or tearing of the map during its passage from one side to the other of the casing, may not occur.

The present invention provides a device of the general nature of the above wherein no spools are required to move the map in either direction which therefore eliminates the tendency of the latter to jam or tear and which provides a map which automatically assumes a roll at either end and therefore will automatically confine itself to a small space. By eliminating the spools, the device of the present invention may be provided with a relatively uncomplicated driving arrangement which therefore reduces the cost of the entire device and which will therefore provide for easy replacement and removal of the maps to be used.

The present invention comprises a casing having a window, a pathway in the casing for guiding a strip map across the window, at least one driving roller journalled for rotation in the casing adjacent the window and having a portion of the peripheral edge extending into the pathway so as to engage the strip map, said pathway being arranged to maintain the map in frictional engagement with the roller, means for manually rotating the driving roller so as to move the strip map in the direction of its length.

In the drawings which illustrate the invention,

FIGURE 1 is an isometric view of the invention illustrating a base and a cover section in an open position, FIGURE 2 is a sectional view taken along line 2—2 of FIGURE 1 in which the cover section has been arranged in a closed position over the base, and FIGURE 3 is a section taken along line 3—3 of FIGURE 1 again with the cover section arranged in the closed position.

Referring to the drawings, there is illustrated a map holder 10 having a base 11 to which a cover section 12 is hingedly secured, and rotatably journalled on the base is a manually operated map driving assembly 13 by means of which the map 14, of the strip type, may be advanced in either direction over the base.

Both the base 11 and the cover section 12 may be molded in one operation of a thermoplastic material, the base taking the form of an elongated rectangularly shaped sheet having a platform member 15 upstanding from the normal flat surface 16 of the base. The platform member has an upper rectangularly shaped horizontal surface 18, vertical side walls 19, and convexly shaped end walls 20, said side and end walls emerging at their lower ends with the flat surface 16 of the base. The surface 18 of the platform member is provided with a centrally located transversely extending elongated slot 22, the latter being widened as at 23 at opposite ends thereof, and the side walls 19 are provided with upwardly opening vertically elongated notches 24 aligned at their open upper ends with the slot 22.

The driving assembly 13 comprises an elongated cylindrical spindle 30 which fits transversely across the horizontal surface 18 of the platform member downwardly in the slot 22 and rests in the notches 24, the spindle being of sufficient length that it has end portions 31 extending outwardly beyond the side walls 19 of the platform member. A pair of driving rollers 32 are pressure-fitted on the spindle, said rollers each having a centrally located groove 33 in the peripheral edge and tightly fitted in the groove a rubber O-ring 34. The driving rollers 32 are located on the spindle 30 so that one of each lies directly beneath the widened portion 23 of the slot 22 and with the upper portion of the rubber O-ring 34 extending slightly above the flat surface of the platform member 15.

A pair of large diameter operating discs 35 having peripheral edges 36 are pressure-fitted on the end portion 31 of the spindle 30, the lower periphery of the discs extending below the base through apertures 38 suitably formed therein.

The cover section 12 is formed having vertical side walls 40, and arcuately shaped end walls 42, the latter having transversely extending upper edges 43, the side walls having inwardly turned upper edge portions extending between said upper edges 43 to form longitudinally extending flange elements 44. These flange elements have smooth undersurfaces 45 and define with the edges 43 of the end walls a centrally located window 46. The cover section is formed having the same width and length as the base, and is joined during the molding thereof to the base by a pair of resilient strap elements 48 which serve as hinges to permit the cover sections to be moved from an open position, as shown in FIGURE 1, to a closed position over the base, as shown in FIGURES 2 and 3. Inwardly extending dogs or latches 50 are formed on the free edge of one of the end walls 42 which normally engage outwardly extending dogs or latches 51 formed on the free edge of the base when the cover section is arranged in its closed position. In order to open the cover, the dogs which are formed of the same resilient material as the cover and base, may be flexed into a disengaged position to permit the holder to be opened.

The side walls 40 of the cover section are each provided with outwardly opening notches 52 formed intermediate of the ends thereof which, when the cover section is placed in its closed position, overlie the spindle 31.

The cover section 12 is so dimensioned that when it is arranged in its closed position over the base, the flange elements 44 normally press against the rubber O-ring 34 of the driving rollers 32. These rollers maintain the undersurfaces 45 of said flange elements spaced slightly above the horizontal surface 18 of the platform member 15 so that there is formed between said undersurface 45 and the horizontal surface 18, a pair of thin passageways 53.

In the use of the holder, the map 14 which is to be used, is of a strip type being greatly elongated and of a width slightly in excess of the distance between the paired driving rollers 32. The portions of the map hereinafter called the side edge portions 54 thereof, are milled or corrugated as at 55. The map is preferably formed having a flat sheet base section 56 formed of a stiffly resilient paper material which assumes, in its normal state of repose, a transversely extending roll. This type of material is of well known manufacture and need not to be further described. The visible portion of the map may be formed of a thin paper 57 which may be cemented to the base thereof by any suitable adhesive.

The holder 10 is opened, and the map unrolled and placed over the platform member 15 with the rolled ends thereof lying upon the arcuately-shaped end surfaces 20. The cover section 12 is then closed over the base, the arcuately-shaped end walls 42 of the cover section and the arcuately-shaped end surfaces 20 of the platform member forming a pair of transversely extending compartments to hold the rolled end portions of the map. The flange elements 43 will of course bear down upon the side edge portions so as to bring the latter in tight frictional engagement with the rubber O-rings 34 of the driving rollers 32. Upon rotation of the discs 35, the driving rollers may then be rotated in any direction, the frictional engagement of the O-rings with the map, driving the latter in the direction desired.

It will be appreciated that the map exhibiting apparatus herein described is extremely simple of operation, permitting the interchange of maps when desired, and furthermore it does not require careful and exact placing of the maps as they form automatic rolls within the compartments provided therefor, the alignment of the strip maps with the window being automatic.

It will be further understood that the various components of the apparatus as hereinbefore described may be modified within the scope of the appended claims without departing from the spirit of the invention.

What I claim as my invention is:

1. Map exhibiting apparatus comprising an elongated precurled strip map, and elongated base, a platform located centrally on the base, said platform having an upper planar surface portion and vertical side walls, said upper surface portion being provided with a centrally located transverse opening extending completely thereacross, and said side walls each being provided with a centrally located upwardly opening vertically extending notch, a cover section having a window formed centrally therein and being hingedly secured to the base for movement between open and closed positions, said window being located over the platform when the cover section is closed, longitudinally extending flange elements formed on the cover section on opposite sides of the window having smooth under surfaces extending parallel to and slightly above the platform when the cover section is closed so as to form a pair of thin pathways adapted to slidably pass opposite side edge portions of the map so as to guide the map across the window in the direction of its length, a transversely extending elongated spindle rotatably fitting in the notches below the platform so as to be rotatably supported by said side walls, said spindle having opposite end portions extending outwardly beyond the base, manually operable operating rollers non-rotatably connected to the opposite ends of the spindle for rotating the latter, a pair of driving rollers secured to the spindle for rotation therewith extending partially above the platform in to the pathways for frictionally engaging said side edge portions of the map so as to move the latter in the direction of its length as the spindle is rotated, and a pair of transversely extending compartments formed in the casing at each end of the platform communicating with the pathways to receive said end portions of the map as the latter is moved.

2. Map exhibiting apparatus as claimed in claim 1 in which the side edge portions of the map are provided with transversely extending corrugations.

References Cited
UNITED STATES PATENTS

| | | | |
|---|---|---|---|
| 1,553,906 | 9/1925 | Marette | 40—86 |
| 3,016,638 | 1/1962 | Singer | 40—86 X |
| 3,195,242 | 7/1965 | Ward et al. | 40—86 X |

EUGENE R. CAPOZIO, *Primary Examiner.*

W. H. GRIEB, *Examiner.*